Nov. 12, 1968     T. R. TROUTMAN     3,410,349
TUBING SCRAPER AND METHOD
Filed Jan. 2, 1964     4 Sheets-Sheet 1
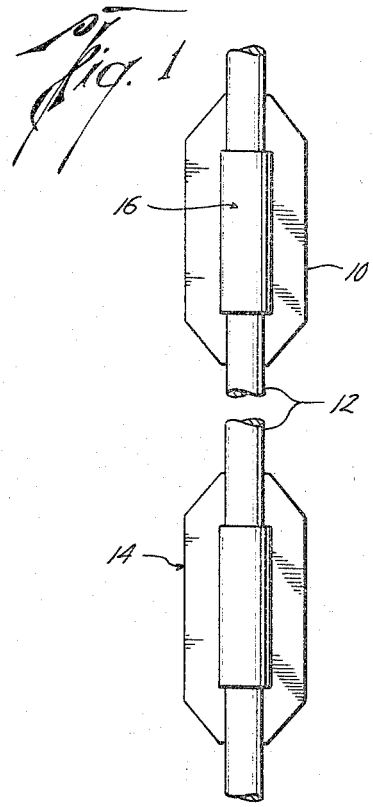
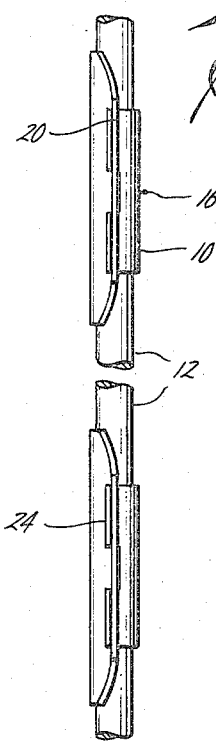
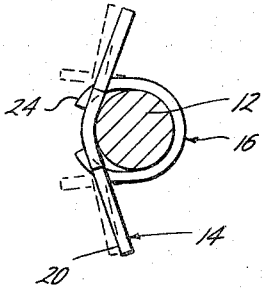
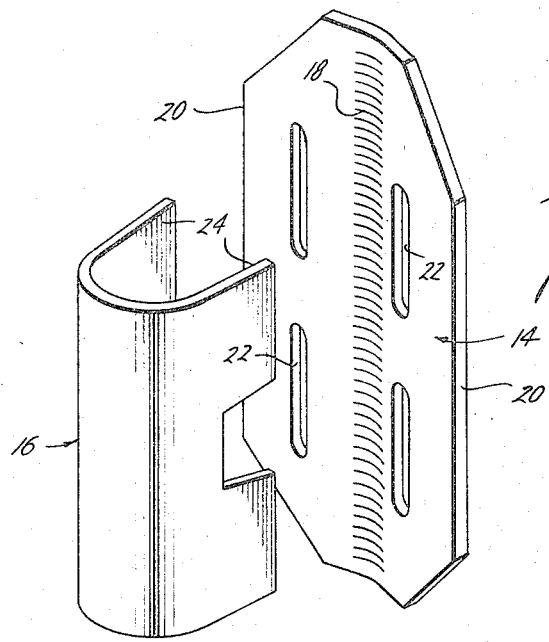
Ted R. Troutman
INVENTOR.
BY J. Vincent Martin
Joe E. Edwards
M. H. Gay
ATTORNEYS

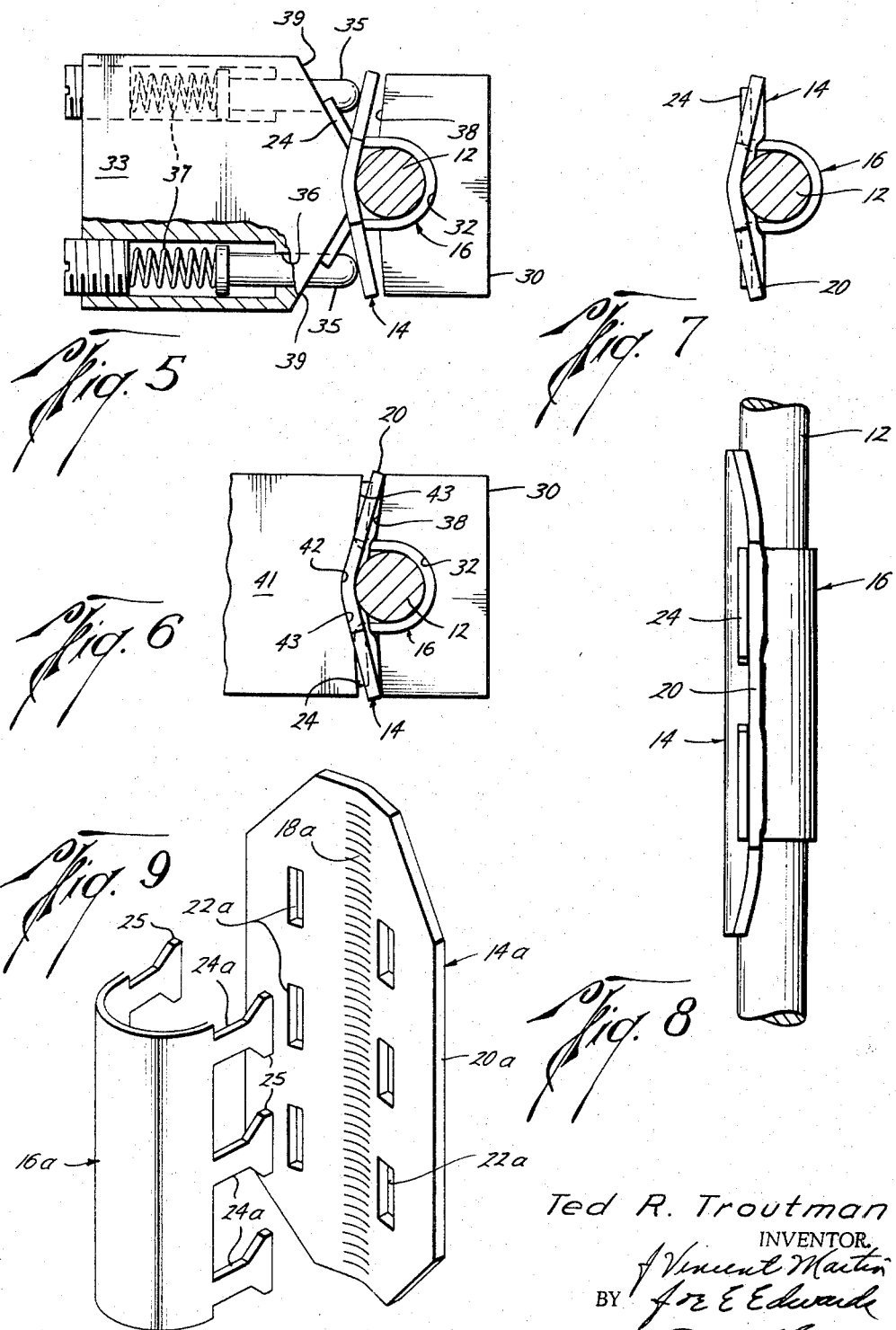

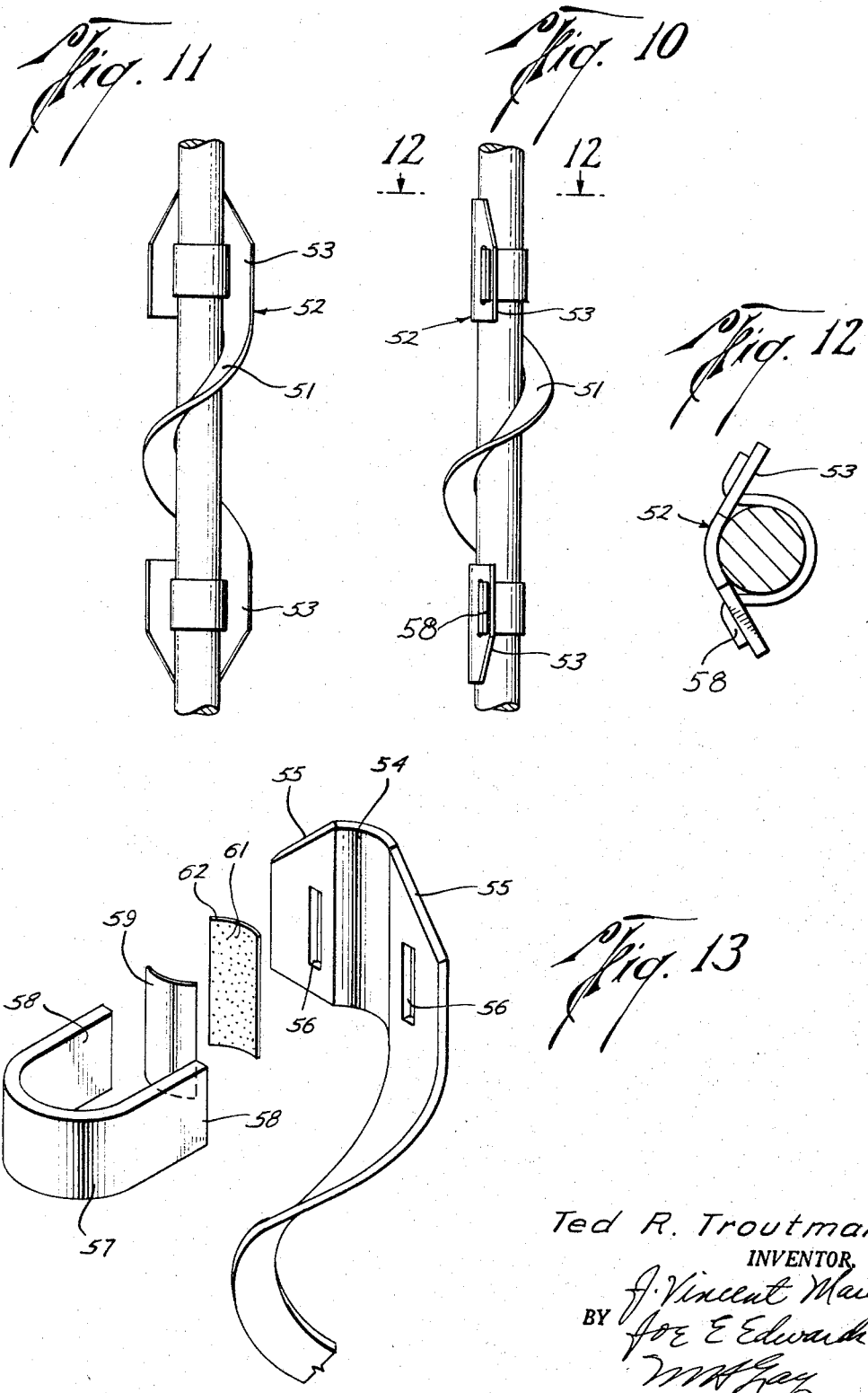

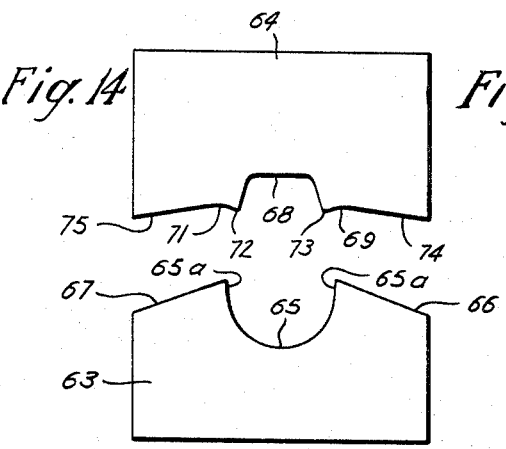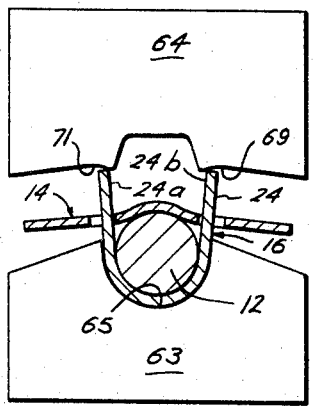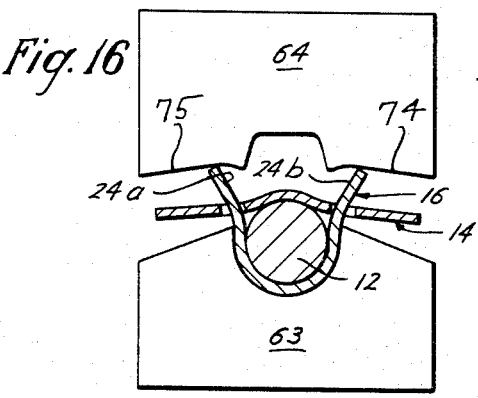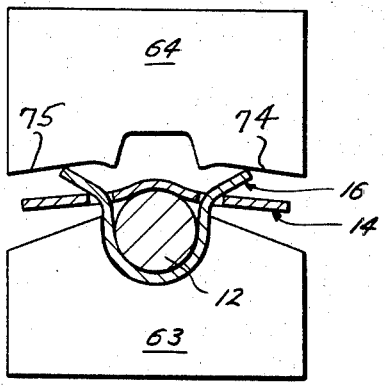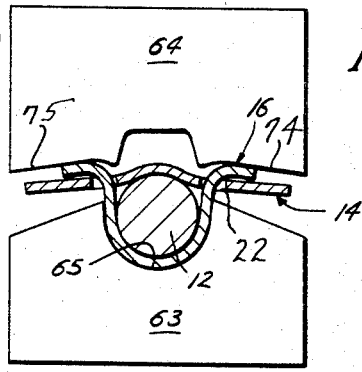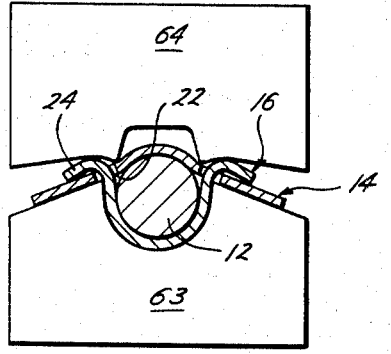

United States Patent Office 3,410,349
Patented Nov. 12, 1968

3,410,349
TUBING SCRAPER AND METHOD
Ted R. Troutman, Box 966, Old San Marcos Road W.,
Luling, Tex. 78648
Continuation-in-part of application Ser. No. 141,810,
Sept. 29, 1961, which is a continuation-in-part of
application Ser. No. 83,519, Jan. 18, 1961. This
application Jan. 2, 1964, Ser. No. 336,612
14 Claims. (Cl. 166—176)

ABSTRACT OF THE DISCLOSURE

This patent discloses a sucker rod scraper and method of applying the scraper to a sucker rod in which a blade-like scraper is crowned to the sucker rod. A U-shaped clamping member is positioned on the opposite side of the sucker rod from the scraper and has ears extending through holes in the scraper. During the crowning action the ears are bent into snug engagement with the blade and hold the blade in crowned position. During the crowning action the blade is bent and the springback force of the blade holds the scraper firmly on the sucker rod.

---

The present invention relates to an improved tubing scraper for attachment to sucker rods used in pumping oil wells and to methods of attachment of tubing scrapers to such sucker rods. This application is a continuation-in-part of my pending application Ser. No. 141,810 filed Sept. 29, 1961, now abandoned, for Tubing Scraper and Method, which was a continuation-in-part of my application Ser. No. 83,519 filed Jan. 18, 1961, now abandoned, for Tubing Scraper and Method.

In the production of oil from an oil well, there is generally provided a casing and a string of production tubing set within the casing through which the oil, gas and the like is produced. In the event the formation pressure from which the oil is being produced is insufficient to cause the oil to flow to the surface, various means are utilized in bringing the oil to the surface. One such means is the provision of a pump as a portion of the tubing located at or near the producing zone traversed by the well bore which is actuated by a string of rods, generally known as sucker rods, which extend to the surface and which are actuated by some type of pumping unit on the surface.

In many instances the oil which is being produced contains paraffin, such as paraffin base and other oils, as well as other substances which congeal and precipitate out of the oil and coat the inner walls of the tubing. In the case of paraffin deposits, ordinarily temperature of the formation is sufficiently high to maintain the paraffin deposits in solution. As the oil moves up the tubing, however, it becomes cooler and, at a certain point, the temperature of the oil is reduced to where the paraffin precipitates out and coats the inner walls of the tubing. Such paraffin deposits and coatings seriously impair and obstruct the flow of oil by reducing the effective flow area of the tubing. Various mechanical, chemical and electrical devices have been utilized or proposed to prevent such deposits and to remove deposits once formed.

One such commercially accepted means has been the use of mechanical scrapers secured to the sucker rods which scrape the tubing as the sucker rods are reciprocated by the pumping unit at the surface. Ordinarily, means are provided at the surface for intermittently rotating either the sucker rods or the tubing or both when using mechanical scrapers so that the relatively flat type blades scrape around the entire circumference of the inner wall of the tubing thus scraping the paraffin deposits from the tubing, which deposits flow up to the surface with the oil being produced. Generally, these mechanical scrapers are spaced at intervals from or below the point where the paraffin begins to deposit to the surface to maintain the inner wall of the tubing or other string of pipe through which the oil is being produced free of such deposits to an extent which avoids interference with the flow of oil therethrough.

Among the commercially accepted mechanical scrapers are those which are more or less in the shape of a relatively flat blade which is attached to the sucker rod ordinarily by welding, although there have been suggestions in the art that these may be attached by other means.

In the case of welding the paraffin scrapers about the sucker rods, this has generally been unsatisfactory due to the fact that it is necessary to remove the sucker rods from the well, transport them to a shop for installation, and return them to the well to reinstall them, which requires a considerable length of time during which the well is shut down and production during the shutdown period is lost. Welding is not well suited for field techniques due to the tendency of sucker rods to deform when locally heated during the welding operation and the heavy equipment needed for welding.

With respect to the other types of attachment of the paraffin scrapers to the sucker rods, these also have been generally unsatisfactory due to their complexity, or the use of threads, such as threaded U-bolts and nuts which become corroded in use and loosen, break off and the like.

The present invention is directed to an improved paraffin scraper, its means and method of securing to the sucker rod, which advantageously may be accomplished in the field with a minimum of equipment and shutdown time, which advantageously avoids taking the sucker rods into the shop with the resultant shutdown period and loss of production and which requires only a simple press or clamping means which is readily and easily transported and used in the field.

It is therefore an object of the present invention to provide an improved paraffin scraper which can be readily and securely clamped to a sucker rod in the field without welding and by means of a very simple and effective clamp member.

A further object of the present invention is the provision of an improved paraffin scraper, the blade of which is securely clamped to a sucker rod by an elongate U-shaped clamping member having ears which interlock with the blade.

Yet a further object of the present invention is the provision of an improved paraffin scraper whose blade is yieldingly deformed when attaching the blade to the sucker rod with the clamping member and in which the springback characteristics of the deformed blade further increases the clamping force of the scraper to the sucker rod.

Yet a further object of the present invention is the provision of a method of attaching a paraffin scraper to a sucker rod by which the blade of the paraffin scraper can be securely clamped to the sucker rod in the field in an inexpensive and improved way.

Yet a further object of the present invention is the provision of a method of securely attaching a paraffin scraper to a sucker rod where an elongate U-shaped clamping member provided with ears is crowned about a sucker rod with the ears extending through corresponding slots in an elongate blade crowned against the opposite side of the sucker rod and the ears are bent against the blade.

Still a further object of the present invention is the provision of a method of attaching a paraffin scraper to a sucker rod which includes placing an elongate U-shaped clamping member and an elongate blade on opposite sides of a sucker rod with ears on the clamping member extending through slots in the blade, placing the clamping member and blade in a die assembly between opposing dies and pressing the dies together, wherein the blade and clamping member are crowned into firm engagement with the rod and ears are bent against the blade and the springback characteristics of the blade provide substantial clamping force.

Still a further object of the present invention is the provision of a method of attaching a paraffin scrapper to a sucker rod which includes placing an elongate U-shaped clamping member and an elongate blade on opposite sides of a sucker rod with ears on the clamping member extending through slots in the blade, placing the clamping member and blade in a die assembly between opposing dies and pressing the dies together, whereby the blade and clamping member are crowned into firm engagement with the rod and the ears are bent outwardly into engagement with the blade by the dies and hold the blade in deformed position whereby the deformed blade and the springback characteristics of the crowned blade provide substantial clamping force.

Another object is to provide a method of attaching a paraffin scraper to a sucker rod with a clamping member with a single pass of a die.

Another object is to provide a method of attaching a paraffin scraper to a sucker rod with a clamping member in which a single pass with a die spreads ears on the clamping member first outwardly and then downwardly to the blade and then rolls the ears outwardly and crowns the scraper and clamping member firmly to the rod while placing the scraper in stress, so that the scraper and clamping member firmly grip the rod.

Other and further objects, features and advantages will be apparent from the following description of presently preferred embodiments of the invention, given for the purpose of disclosure, and taken in conjunction with the accompanying drawings, where like character references designate like parts throughout the several views, and where FIGURE 1 is a partial elevational view of a sucker rod having a plurality of paraffin scrapers according to the present invention attached thereto, FIGURE 2 is a side view of FIGURE 1, FIGURE 3 is an end view of the paraffin scrapers of the type shown in FIGURES 1 and 2 showing the attachment to a sucker rod with ears bent inwardly instead of outwardly as shown in FIGURES 1 and 2, and showing in dashed lines the scraper configuration before the clamping operation, FIGURE 4 is an expanded isometric view of the paraffin scraper of FIGURES 1–3 shown disassembled, FIGURE 5 is a partial end view of dies suitable for attaching the paraffin scraper of the present invention to a sucker rod, showing the blade and clamping member being crowned to a rod and the ears being pushed over, FIGURE 6 is a view similar to FIGURE 5 showing the scraper in a second die assembly where the crimping operation is completed, FIGURE 7 is an end view, partially in section, of the paraffin scraper of FIGURES 5 and 6 attached to the sucker rod illustrating the distortion of the blade during the crowning process, FIGURE 8 is a side view of the paraffin scraper of FIGURE 7, FIGURE 9 is an isometric expanded view of a modification of the paraffin scraper of the present invention, FIGURE 10 is an elevational view of a modified form of scraper shown crimped about a rod in accordance with this invention, FIGURE 11 is a view similar to FIGURE 10 with the scraper rotated 90°, FIGURE 12 is a view along the lines 12—12 of FIGURE 10 with the spiral portion of the scraper omitted for clarity, and FIGURE 13 is an isometric exploded view of a fragment of the paraffin scraper shown in FIGURES 9 through 11, FIGURE 14 is an end view of a bed die and a forming die for securing the scraper to a rod with one pass of the forming die, and FIGURES 15 through 19 show progressively the movement of the forming die toward the bed die and the manner in which the scraper is secured to the rod.

In general, and before referring to the drawings, the paraffin scraper of the present invention generally includes an elongate U-shaped clamping member having ears and an elongate blade preferably having a knurled arcuate portion and slots corresponding to the ears, both of which are designed to fit about and interlock upon a tubular sucker rod usually cylindrical, and a method of attaching the paraffin scraper to a sucker rod in the field including placing the clamping member and blade in interlocking relationship about a sucker rod and pushing over the ears while crowning the blade and the clamping member thereby securely attaching the paraffin scraper to the sucker rod.

Referring now to the drawings, and particularly to FIGURE 1, the reference numeral 10 generally designates a paraffin scraper according to the present invention, shown attached to a sucker rod 12. A series of paraffin scrapers 10 are attached to the sucker rod 12, and are spaced apart thereon a little less than the total length of reciprocation of the sucker rod 12 when actuating a pump, not shown, down hole in the tubing, also not shown. It is, of course, possible to provide a series of continuous paraffin scrapers extending the entire length of the sucker rods, but only a few, when properly spaced, are necessary.

A side view of the paraffin scraper 10 attached to the sucker rod 12 is shown in FIGURE 2. A comparison of FIGURES 1 and 2 shows the paraffin scrapers 10 mounted in the same plane. It is, however, inconsequential whether the paraffin scrapers are mounted in the same plane or whether rotated with reference to one another, so long as they are securely attached to the sucker rod according to the present invention.

Referring now to FIGURE 4, it is seen that the paraffin scraper 10 includes a blade or scraper 14 and a clamping member 16. The blade 14 is an elongate plate-like member preferably having an arcuate portion 18 centrally located along the long axis. The arcuate portion 18 is designed to be crowned to enclose a corresponding section of the sucker rod to which it is to be attached. In this manner, the bearing or abutting surface between the arcuate portion 18 and the sucker rod 12 is substantially increased, thereby making possible a secure attachment. In addition, the arcuate portion 18 is knurled to provide a multitude of sharp edges which frictionally engage the sucker rod, thereby further intensifying the secure attachment of the paraffin scraper 10 to the sucker rod 12, and particularly those which are rusty, pitted or greasy. It has been found that an arcuate portion 18 encompassing about one-fourth of the circumference of the sucker rod 12 provides more than adequate holding capacity when combined with the clamping member 16 as hereinafter described. As the blade is crowned in a press in the preferred method of attachment it may be flat, but the arcuate portion as shown is preferred.

The blade 14 has elongate cutting or scraping edges 20 parallel to the long axis thereof on opposite sides of the arcuate portion. The width of the blade 14 is determined by the diameter of the tubing in which the paraffin scraper 10 is to be used. Typically a clearance of approximately ⅛" is utilized. The top and bottom of the blade 14 are beveled toward the edges 20 to aid in the insertion of the sucker rod 12 with paraffin scraper 10 attached into the tubing, not shown. Adjacent the arcuate portion 18 on the flat part of the blade 14 are the slots 22 which correspond with and receive the protruding ears 24 on the clamping member 16 as hereinafter described.

The clamping member 16 is an elongate plate of generally U-shaped configuration. The ears 24 extend from the ends of the clamping member 16 and are sized to pass through the slots 22 in the blade 14. These ears 24 are subsequently pushed over, in a manner hereinafter described, when attaching the paraffin scraper 10 to the sucker rod 12. The U-shaped clamping mmeber 16 preferably encompasses approximately one-half of the circumference of the sucker rod 12 and its inner face is curved to approximate its diameter.

As was previously mentioned, the arcuate portion 18 of the blade 14 preferably encompasses approximately one-fourth of the circumference of the sucker rod 12, while the U-shaped clamping member 16 encompasses about one-half, thus leaving a small portion unencompassed. In this manner provision is made for varying sizes of sucker rods 12 having a given nominal diameter. Thus, it is not unusual to find that a 5/8" diameter sucker rod is actually 1/16" less in diameter, due to usage, manufacturing tolerances and the like. Other encompassing ranges may be utilized, however, the above mentioned preferred ranges are highly satisfactory and advantageously assist in securing the paraffin scraper to sucker rods yet providing for variations in size of the sucker rods, as previously mentioned.

In attaching the paraffin scraper 10 to the sucker rod 12, the blade 14 with the arcuate knurl or friction portion 18 is placed up against the sucker rod 10, the clamping member 16 is placed against the other side of the sucker rod 12 with the ears 24 projecting through the slots 22. In one method the blade and clamping member are crowned to the rod and the ears are bent to hold the assembly about the rod. The ears 24 are then forcibly bent over and the blade and clamping member again crowned by a separate die, thereby tightly clamping the paraffin scraper to the sucker rod 12. In another form, a single forming die is used which crowns and bends the ears in a single operation.

Referring now to FIGURES 5 and 6, a portion of a suitable hydraulic press is illustrated for clamping the paraffin scraper to the sucker rod. The hydraulic press includes a die 30 which includes a generally arcuate portion 32 shaped to conform to the outer configuration of the U-shaped clamp member 16, that is, curved the same and sized to fit this member. The sucker rod 12 is then placed into the U-shaped clamp member 16 and the scraper blade 14 with the arcuate knurled or friction portion is then placed on the other side of the sucker rod 12 with the ears 24 projecting through the slots in the blade 14.

With the parts in this position, a second die 33 performs the first step of crimping the paraffin scraper about the sucker rod. The die 33 has an arcuate face for crowning the blade 14 about the rod.

In its original uncrimped form the scraper blade 14 will not engage die 30. In order to correctly position the blade 14 over rod 12 so that the distance from the scraping edges 20 of the blade to the die in each case is approximately equal, the die 33 carries a pair of aligning pins 35 on opposite sides of die face 34. These aligning pins reciprocate in guide ways 36 in the die and are urged outwardly by springs 37 in the bottom of guide ways 36. The pins extend through the space between the ears when the ears are bent outward as shown in FIGURE 5. Thus, as die 33 moves toward die 30, the two pins 35 will engage scraper blade 14 and properly position it for the crimping action.

After the blade 14 is levelled by aligning pins 35, the arcuate die face 34 comes into engagement with the arcuate portion 18 of blade 14. Substantial pressure is exerted in bringing the two dies together to firmly crown the clamping means and the blade around and against the sucker rod 12. The word "crowned" is used herein to mean that the clamping means and blade are forced to conform to the surface of the sucker rod about a substantial portion of the sucker rod. As noted from FIGURE 5, the clamping means will be crowned about approximately one-half of the rod and the scraper blade will be crowned about approximately one-fourth of the sucker rod. During the crowning operation the scraper blade 14 will be bent from its slightly arcuate position to the position shown in FIGURE 5.

In order to spread the ears 24 during the initial crimping process, the die 33 is provided with inclined wedge surfaces 39 on opposite sides of the arcuate die portion 34. As the die 33 is moved toward die 30, these wedge surfaces, which are inclined at approximately 45° to the direction of movement of die 33, engage ears 24 and begin to fold the ears over toward crimped position. When the first stage of the crimping operation is completed, the clamping means and blade are firmly crowned to the sucker rod 12 and are held in this position by the partially bent ears 24.

Thereafter, a second die may be used to complete the crimping operation. This operation is shown in FIGURE 6. A second die 30 identical to the die 30 shown in FIGURE 5 is utilized, and its description will not be repeated. The partially crimped scraper is placed in the second die 30 with the clamping means in the die cavity 32. A third die 41 is then moved toward the second die 30 to complete the crimping operation. This die has an arcuate die surface 42 similar to die surface 34 of die 33. Extending in opposite directions from this arcuate die surface is a pair of flat die surfaces 43 which are generally parallel to the flat surfaces 38 of the second die 30. As the die 41 moves toward the second die 30 these surfaces 43 engage the partially spread ears 24 and complete the bending of the ears into final crimped position. In the final crimping the scraper is again crowned by the action of the second die 30 and the third die 41.

At the completion of the crimping operation shown in FIGURE 5, the scraper has a firm, tenacious grip on the sucker rod. This is due to the fact that the scraper is made from yieldable steel material preferably on the order of 1/8" thickness. The crowning operation bends the steel, and particularly the steel of the blade across the arcuate portion, and then the ears are spread holding the crowned parts in their crowned position. Substantial springback is present in the parts at this time due to the deformation caused by crowning. As shown in the drawing, the crowning action deforms the blade beyond the yield point of the material.

To provide a still greater crimping force the ears are then bent back into engagement with the blade at points outwardly from the slots 22. During this bending operation the blade outwardly from the slots is also deformed to provide additional springback which provides an additional terrific crimping force due to the moment arm through which which the force is exerted.

The distortion of the blade due to the final crimping action of the dies of FIGURE 6 is illustrated in FIGURES 7 and 8. It will be noted that the blade is bent more in the region of the ears 24 than at the longitudinal extremities of the blade or at the intermediate portion of the blade between the ears.

Any suitable type pressing assembly may be utilized. For most installations a pressing unit having about a 20,000 pound capacity is satisfactory. The press can be either of the hydraulic or mechanical type, for example, a punch press, or any other pressing or hammering unit may be utilized.

While the ears are shown as pressed outwardly, if desired they may be bent in an inwardly direction as shown in FIGURE 3. In this instance the arcuate section of die 33 would be smaller in extent and the ear-bending surface would slope in the opposite direction, as is obvious from a consideration of FIGURE 3. This figure illustrates in dashed outline the configuration of the scraper before it had been crowned about the sucker rod. The full line showing illustrates crowning, particularly of the blade 14.

Obviously the scraper should be made of steel, or other suitable material, and should have excellent spring qualities to permit it to be yieldingly deformed during the clamping operation and to generate tremendous springback forces once the die pressure is released.

The method illustrated in FIGURES 5 and 6 might be summarized as follows: First, place a generally U-shaped member such as 16 about a sucker rod 12. Then, an elongate blade having slots therein is placed on the other side of the sucker rod 12. Ears on the clamping means extend through the slots. The blade and clamping means are then crowned to the sucker rod and while held in crowned position the ears bent to complete the crimping action. The ears may be bent inwardly or outwardly. When the ears are bent outwardly they are forcibly bent against the blade to further distort the blade and increase the deformation of the blade to provide additional crimping force due to the springback tendency of the blade. This method is carried out in a two-step operation in which the clamping means and blade are crowned and the ears partially bent. In the second step, further crowning occurs while the ears are bent into full engagement with the blade.

The particular form of the clamping member 16 may be varied so long as it is an elongate U-shaped member as previously described. One such variation is illustrated in FIGURE 9, to which reference is now made, and in which the reference character *a* has been added to numerals indicating corresponding parts to those in the other figures.

Referring now to FIGURE 9, it is noted that the essential difference of the clamping member 16a is in the form and number of the projecting ears 24a, which have the enlargements 25 at their extremities. Corresponding slots 22a are provided in the blade 14a to receive these ears 24a and projections 25.

The remaining parts and means of application are the same as previously described. Accordingly, no further description of this particular form of the invention is deemed necessary or given.

Reference is now made to FIGURES 10 through 13 wherein a modified form of scraper is shown. Some operators prefer to use a scraper having a spiraled scraping surface wound helically about the sucker rod. This is illustrated by the helically extending portion 51 of the scraper blade indicated generally at 52. The helical portion terminates at each end in a flat blade portion 53. The two end portions are given identical numbers as they are identical in form. Each flat blade 53 preferably has an arcuate central section 54 with blade portions 55 on either side thereof. Slots 56 are provided in each of the flat blade portions 55. A U-shaped clamping member 57 is provided for cooperating with the flat blade in the manner of the forms of the invention previously described. In this instance the extremities 58 of the U-shaped blade provide ears equivalent to ears 24. In other words, when in a similar position the free ends of the U-shaped clamping means extends through the slots 56. Each end of the scraper 52 is then crimped to the sucker rod in the manner heretofore explained to firmly crimp the spiral scraper onto the sucker rod as shown in FIGURES 10, 11 and 12.

If desired, a thin sheet of suitable material may be inserted between the sucker rod and one or both of the flat blade portions 53 and the clamping member 57. Of course, this material might also be employed with the other forms of the invention, if desired. This material may be a resilient material as indicated by the sheet of material 59 in FIGURE 13. Any tendency of the scraper to move on the sucker rod would tend to bunch up the resilient material and additional resistance to further movement would thus be generated. As an alternate form, the sheet of material might have embedded therein small sharp particles such as sharp sand particles shown at 61 in sheet of material 62. These sharp rigid particles would also tend to prevent movement of the scraper on the sucker rod. While separate sheets of material 59 and 62 are illustrated, it will be appreciated that either the clamping means or the scraper blade might be coated to provide the same structure. Thus, the material 59 might be rubber or synthetic rubber, for instance, sheet neoprene, and instead of being in a separate sheet it might be vulcanized to either the scraper blade or clamping means. In the case of the sheet of material 62 with the sharp granular particles therein, it is apparent that this might also be rubber secured to the scraper blade. It is further obvious that the sheet of material 62, either as a separate sheet or as applied to the blade or clamping means, might be any suitable adhesive for holding the granular particles 61 in place until the scraper blade has been crimped about the sucker rod.

In FIGURES 14 through 19 there is shown an alternative system of applying the scraper to the rod. The method of forming or bending the elongate blade and the clamping means is substantially the same as hereinabove described. The system principally differs in that the scraper blade and clamping member are not necessarily crowned to the rod in the first stage of the method in which the ears are initially bent. In this system substantially all of the crowning takes place in the last stage of the system. In the previously described system, crowning took place at both stages of the system. The system shown in FIGURES 14 through 19 has the advantage of applying the scraper to the rod with a single pass of the forming die.

Referring first to FIGURE 14, the bed die 63 and the forming die 64 may be carried in any suitable press such as hereinabove discussed. Preferably, a hydraulic press is used. The dies are shown to scale and the particular size illustrated is utilized to secure a scraper to a ⅝" rod. In order to accommodate the clamping means 16, the bed die has a substantially semi-circular recess 65 in its upper surface. The recess is actually slightly more than semi-circular and is formed with a lower semi-circular portion which terminates in a pair of parallel tangential wall sections 65a so that the clamping means is supported over slightly more than one-half of the rod diameter. The diameter of the recess 65 should be equal to the diameter of the rod plus twice the thickness of the clamping means, so that the recess will firmly support the rod and the clamping means and will be capable, upon pressure being applied, of firmly crowning the clamping means to the rod.

Extending outwardly from the recess 65 are a pair of identical surfaces 66 and 67. These surfaces extend at an angle outwardly and toward the base of the die 63 which is sufficient to prevent them from interfering with bending of the elongate scraper blade about the rod. On the other hand, they should be sufficiently shallow angles so that they may make as close to a 90° angle with the surfaces 65a as possible. In this way, the juncture between the surfaces 66 and 67, respectively, with surfaces 65a will be strengthened. Obviously, the angles of the surfaces 66 and 67 are not critical and are determined in accordance with the desired final angle of the scraper blade.

The forming die 64 has its face confronting the bed die 63 contoured to contact the ears on the clamping means and form them to firmly secure the scraper to the rod. The center section 68 of this face of the forming die 64 is cut away as shown so that it will not contact either the ears or the scraper blade. On either side of the relieved section 68 the forming die is provided with curved sections 69 and 71. These curved sections are preferably formed on a radius of approximately ⁵⁄₁₆ of an inch. Their most adjacent extremities are preferably spaced apart by the diameter of the rod on which the scraper is to be mounted plus about .060 of an inch. The widest point of the mouth of the recess 68 should be approximately the diameter of the rod. With this arrangement there are small flat portions 72 and 73 provided between the curved surfaces 69 and 71 and the recess 68.

This prevents the curved section from coming to a sharp point which might cut into the blade or which might be easily broken off. While the rod size may change to thus space the surfaces 69 and 71 differently than illustrated, it has been found that the 5/16 radius works well with all sizes of rods and scrapers. Of course, some variation from this radius is acceptable, but it is preferred to hold these surfaces at 5/16 of an inch.

The two curved surfaces 69 and 71 terminate in surfaces 74 and 75, respectively. These two surfaces extend tangentially from the curved surfaces in opposite directions as shown, and also extend toward the bed die 63. Preferably, these surfaces extend at angle which approximate the angle of the scraper blade before it is secured to the rod. With this arrangement the ears, when initially bent into contact with the scraper blade, will be approximately parallel to the scraper blade. This relationship is not critical, but is preferred. It is desirable that the final relationship of the scraper blade and clamping means be such that the outer extremities of the ears bear against the scraper blade so that the bending force applied to the scraper blade is applied at a point as far as possible away from the rod. From the drawings it will be seen that by forming the surfaces 74 and 75 approximately parallel to the blade before it is fastened to the rod, this relationship will result. A change in the angle of surfaces 74 and 75 is, of course, permissible, but the angles described are preferred.

Reference is now made to FIGURES 15 through 19 in which the successive stages of movement of the forming die and bending of the scraper blade and clamping means is illustrated.

Referring first to FIGURE 15, the blade 14 and the clamping means 16 are placed on opposite sides of the rod 12. The rod and clamping means are received in the bed die 63 with the blade 14 resting on the rod 12. At the beginning of the forming action the forming die 64 engages the ears 24 on the clamping means 16. The confronting surfaces 24a and 24b of ears 24 are simultaneously engaged by the curved surfaces 69 and 71 on the forming die. As the forming die initially moves toward the bed die, the ears 24 are spread along the curved surfaces 69 and 71 toward the flat surfaces 74 and 75, and thence onto the flat surfaces as illustrated in FIGURE 16. By the time the ears reach the flat surfaces 74 and 75, their angles relative to these flat surfaces are such that further downward movement of the forming die will continue to bend the ears outwardly and downwardly.

Further downward movement of the forming die 64 will continue to spread the ears 24 in the manner illustrated in FIGURE 17, that is, outwardly and downwardly toward the blade 14. At this point it might be noted that the ears begin to bear against the blade 14 and this pressure tends to initially firmly seat the rod within the clamping means 16 and the blade 14 on top of the rod. Of course, the previous downward pressure of the forming die 64 against the clamping means had firmly urged it into engagement with the bed die. It might be said at this stage that the die begins to crown the blade and crimping means firmly to the rod 12.

Further downward movement of the forming die 64 continues the downward bending of the ears on the clamping means until the relationship shown in FIGURE 18 is reached. At this time the ears have been bent out to be substantially parallel to the portions of the blade 14 outboard of the slots 22 and also to be substantially parallel to the surfaces 74 and 75. From this point on, further downward movement of the forming die begins to move the point of contact between the ears and the forming die back toward the curved surfaces as the ears at their outer extremities are being bent away from the forming die. As the ears are again contacted by the curved surfaces 69 and 71, a rolling action occurs in which these surfaces roll the ears outwardly and downwardly. This action continues until the forming die 64 has reached its bottom position as shown in FIGURE 19. This rolling action firmly crowns the blade rod and clamping means together. In this position it will be noted that the blade extends approximately parallel to the surface 66 and 67 of the bed die 63. The outer extremities of the ears 24 are quite removed from the forming die 64, and the flats 72 and 73 on the forming die are adjacent the slots 22. In the some instances they may project into the slots 22 inwardly of the ears 24. In either event they do not interfere with the rolling of the ears to the extent desired as the blade below the flats is not in contact with the rod 12. The ears 24 have been rolled to where they are in contact with the blade 14 at their outer extremities and they are slightly spaced from the blade at a point inwardly therefrom. As the die reaches its final position, the blade is in tension in the area between the ears 24. The blade itself has been bent downwardly beyond its yield point by the ears 24, and is in stress due to this bending action. As the forming die is raised, the blade 14 tends to spring back toward its original position, but is held against this action by the ears 24. Thus the tension in the section of the blade between the ears and the stresses in the blade due to its contact with the extremities of the ears 24 tightly secure the blade and clamping means to the rod. It results that the blade and clamping means have been firmly crowned to the rod and the blade and clamping means are in stress to firmly hold the blade on the rod.

While the dies and method illustrated in FIGURES 5 and 6 have been successfully used to fasten the blades on the rods, it will be appreciated that the dies and method shown in FIGURES 14 through 19 are more rapid as only a single pass need be made with a single forming die to completely secure the scraper to the rod, and this method is preferred as it reduces the time required to fasten a scraper blade to a rod.

From the illustration of the three different types of paraffin scrapers, it is apparent that any form of paraffin scraper may be utilized and any form of press may be utilized to carry out the crimping operation.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In combination, a sucker rod and a scraper comprising, a generally thin elongate member having an arcuate portion crowned into snug engagement with the rod, blade-like portions on opposite sides of the arcuate portion, said arcuate portion of said elongated member being deformed beyond its yield point as compared to its condition before crowning, slots in each of the blade portions, clamping means having a U-shaped portion crowned into snug engagement with the rod, and ears on said clamping means extending through said slots and bent into snug engagement with said elongate member and holding said elongate member and clamping means in crowned position.

2. In combination, a sucker rod and a scraper comprising, a generally thin elongate member, said elongate member having an arcuate portion between two flat blade-like portions, said arcuate portion crowned into snug engagement with the sucker rod, said arcuate portion of said elongated member being deformed beyond its yield point as compared to its condition before crowning, slots in the blade-like portions on opposite sides of the arcuate portion, clamping means having a U-shaped portion crowned
to fit snugly about the rod,
and ears on said clamping means projecting through
said slots and bent outwardly into engagement with
said blade-like portions,
said ears holding the arcuate portion of the elongate
member and the U-shaped portion of the clamping
means in crowned position,
said ears further holding said blade-like portions in
deformed position whereby the springback characteristics of the elongate member urges the arcuate portion of the elongate member toward the U-shaped
portion of the clamping member.

3. The combination of claim 2 wherein at least one of said elongate member and clamping members has a friction surface in engagement with the sucker rod.

4. The combination of claim 2 wherein at least one of said elongate member and clamping member is lined with resilient material.

5. The combination of claim 2 wherein at least one of said elongate member and clamping means is lined with abrasive material.

6. As a subcombination, a scraper comprising a generally thin, elongate member and a clamping member for securing the member to a sucker rod,
said elongate member having an arcuate center section adapted to be crowned snugly against a sucker rod and flat blade-like portions extending tangentially outwardly from said center portion,
the opposite edges of said blade-like portions being a substantial distance from said center section and providing scraping edges adapted to scrape paraffin from the wall of a well tubing,
slots in said blade-like portions on opposite sides of said arcuate center portion,
said clamping means having a U-shaped portion adapted to be crowned about a sucker rod,
and ears on said clamping member adapted to project through said slots and to be bent to clamp the elongate member and clamping member in crowned position about a sucker rod.

7. The method of securing a scraper to a sucker rod wherein the scraper includes an elongate member having slots therethrough and portions extending outwardly from said slots, and clamping means having a U-shaped portion curved to fit about a sucker rod and ears thereon comprising,
placing said elongate member and clamping means on opposite sides of a rod with said ears extending through said slots,
crowning said elongate member and clamping means into snug engagement with said rod while simultaneously bending said ears from their U-shape into engagement with said elongate member to clamp said scraper to the rod, said elongate member being bent by the crowning action beyond its yield point.

8. The method of securing a scraper to a sucker rod wherein the scraper includes an elongate member having slots therethrough and portions extending outwardly from said slots, and clamping means having a U-shaped portion curved to fit about a sucker rod and ears thereon comprising,
placing said elongate member and clamping means on opposite sides of a rod with said ears extending through said slots,
crowning said elongate member and clamping means into snug engagement with said rod while simultaneously bending said ears outwardly from the U-shape into engagement with and deforming said portions, said elongate member being bent by the crowning action beyond its yield point,
said ears holding said elongate member in crowned position and said portions in deformed position so that the springback characteristics of the elongate member causes said elongate member and clamping means to tightly grip the rod.

9. The method of securing a scraper to a sucker rod wherein the scraper includes an elongate member having a center portion and flat portions extending outwardly on opposite sides thereof,
slots in said flat portions,
and U-shaped clamping means having ears thereon comprising,
placing said elongate member and clamping means on opposite sides of a rod with the ears extending through said slots,
crowning said elongate member and clamping means into snug engagement with said rod while simultaneously bending said ears outward sufficient to lock said elongate member and clamping means in place,
and then bending said ears into engagement with and deforming said elongate member while crowning said elongate member and clamping means, said elongate member being bent by the crowning action beyond its yield point,
said ears holding said elongate member in crowned position and said portions in deformed position so that the springback characteristics of the elongate member cause said elongate member and clamping means to tightly grip the rod.

10. The method of securing a scraper to a sucker rod wherein the scraper includes an elongate member having spaced slots therein and portions extending outwardly from said slots, and clamping means having a U-shaped portion curved to fit about a sucker rod and ears on each leg of the U-shaped portion comprising;
placing said elongate member and clamping means on opposite sides of a rod with said ears extending through said slots;
as a single continuous operation simultaneously bending said ears on each leg of the clamping means into engagement with the elongate member,
and thereafter as a part of said single continuous operation simultaneously crowning said elongate member and clamping means into tight engagement with said rod by continuing the bending of said ears toward the elongate member and rolling the ears toward their free ends.

11. The method of securing a scraper to a sucker rod wherein the scraper includes an elongate member having spaced slots therein and portions extending outwardly from said slots, and clamping means having a U-shaped portion curved to fit about a sucker rod and ears on each leg of the U-shaped portion comprising;
placing said elongate member and clamping means on opposite sides of a rod with said ears extending through said slots,
as a single continuous operation simultaneously bending said ears on each leg of the clamping means away from the ears on the other leg and into engagement with the elongate member,
and thereafter as a part of said single continuous operation simultaneously crowning said elongate member and clamping means into tight engagement with said rod while slightly deforming the elongate member about the rod by continuing the bending of said ears toward the elongate member and rolling the ears on each leg of the U-shaped member toward their free ends.

12. The method of securing a scraper to a sucker rod wherein the scraper includes an elongate member having spaced slots therein and portions extending outwardly from said slots, and clamping means having a U-shaped portion curved to fit about a sucker rod and ears on each leg of the U-shaped portion comprising;
placing said elongate member and clamping means on opposite sides of a rod with said ears extending through said slots;
as a single continuous operation simultaneously bending said ears on each leg of the clamping means away from the ears on the other leg and into engagement with the elongate member, and thereafter as a part of said single continuous operation bending said ears further and rolling said ears on each leg of the U-shaped member away from the ears on the other leg to tightly crown the elongate member and clamping means into snug engagement with said rod, said elongate member being bent by the crowning action beyond its yield point.

13. The method of securing a scraper to a sucker rod wherein the scraper includes an elongate member having spaced slots therein and portions extending outwardly from said slots, and clamping means having a U-shaped portion curved to fit about a sucker rod and ears on each leg of the U-shaped portion comprising;

placing said elongate member and clamping means on opposite sides of a rod with said ears extending through said slots and with the base of said U-shaped portion resting in a bed die sized to support said rod and U-shaped portion;

then moving a forming die toward the bed die and engaging the confronting sides of the ears at their extremities with curved die surfaces to bend said ears outwardly to and along substantially flat surfaces extending tangentially from said curved die surfaces and angled outwardly from the curved die surfaces and toward the bed die;

and continuing the downward movement of the forming die to continue bending said ears outwardly and toward the bed die until said curved surfaces engage an intermediate portion of said ears and roll said ears outwardly and deform and place said elongate member in stress and said U-shaped member in stress while crowning said elongate member and clamping means into firm engagement with said rod.

14. The method of securing a scraper to a sucker rod wherein the scraper includes an elongate member having spaced slots therein and portions extending outwardly from said slots, and clamping means having a U-shaped portion curved to fit about a sucker rod and ears on each leg of the U-shaped portion comprising;

placing said elongate member and clamping means on opposite sides of a rod with said ears extending through said slots and with the base of said U-shaped portion resting in a bed die sized to support said rod and U-shaped portion;

then moving a forming die toward the bed die and engaging the confronting sides of the ears at their extremities with curved die surfaces formed on approximately $5/16''$ radiuses to bend said ears outwardly to and along substantially flat surfaces extending tangentially from said curved die surfaces and angled outwardly from the curved die surfaces and toward the bed die;

and continuing the downward movement of the forming die to continue bending said ears outwardly and toward the bed die until said curved surfaces engage an intermediate portion of said ears and roll said ears outwardly and deform and place said elongate member in stress and said U-shaped member in stress while crowning said elongate member and clamping means into firm engagement with said rod.

References Cited

UNITED STATES PATENTS

| | | | |
|---|---|---|---|
| 1,987,127 | 1/1935 | Rice | 24—22 X |
| 2,321,275 | 6/1943 | Blackburn | 166—176 |
| 2,468,503 | 4/1949 | Lister. | |
| 2,928,473 | 3/1960 | Tripplehorn | 166—176 |

CHARLIE T. MOON, *Primary Examiner.*